Jan. 18, 1927.
T. E. MURRAY
1,614,567
DISK WHEEL
Filed May 27, 1922
2 Sheets-Sheet 1
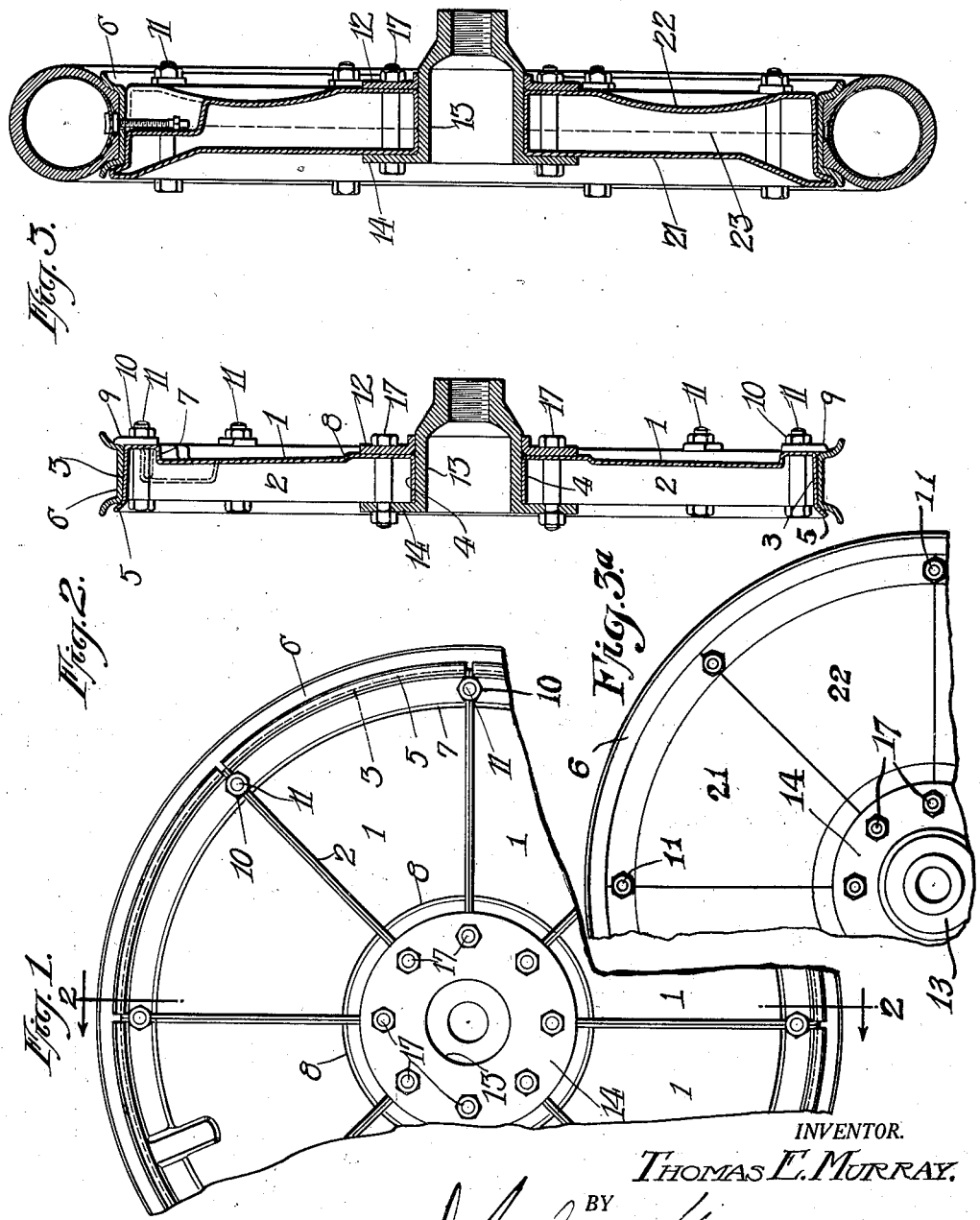
INVENTOR.
THOMAS E. MURRAY.
BY
Anthony Usina, ATTORNEY.

Jan. 18, 1927.
T. E. MURRAY
1,614,567
DISK WHEEL
Filed May 27, 1922
2 Sheets-Sheet 2
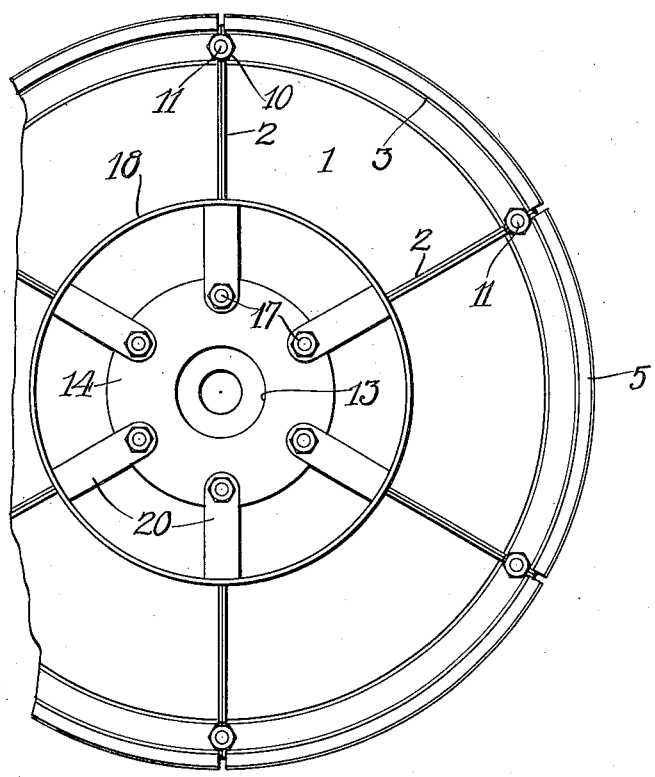
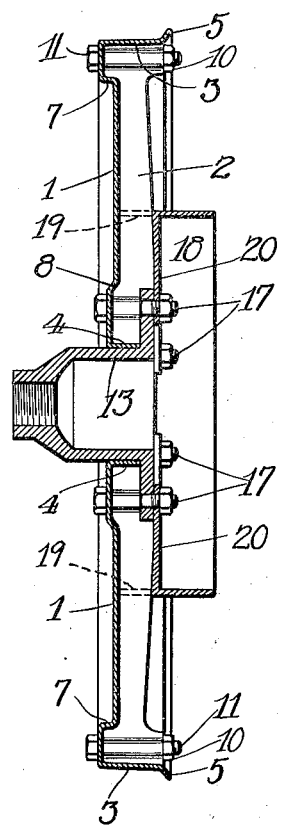
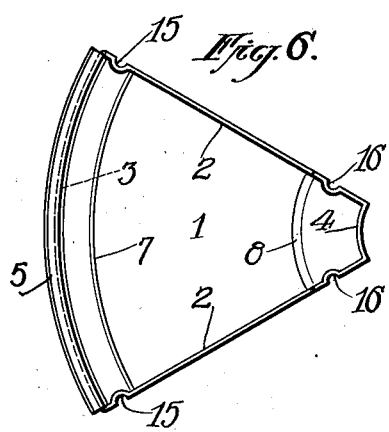
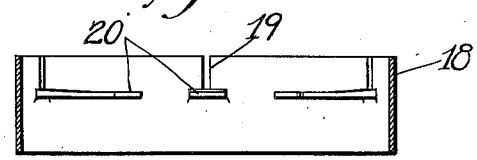
INVENTOR.
THOMAS E. MURRAY.
BY
ATTORNEY.

Patented Jan. 18, 1927.

1,614,567

UNITED STATES PATENT OFFICE.

THOMAS E. MURRAY, OF NEW YORK, N. Y.

DISK WHEEL.

Application filed May 27, 1922. Serial No. 564,076.

My invention aims to provide an improved wheel especially adapted for automobiles, but applicable also to various other uses. The improved wheel can be made very cheaply of sheet metal and is light and efficient.

The accompanying drawings illustrate embodiments of the invention.

Fig. 1 is an inside elevation of the wheel partly broken away;

Fig. 2 is a longitudinal section of the same approximately on the line 2—2;

Fig. 3 is a similar section of a modified form;

Fig. 3ª is an inside elevation of a portion of the same;

Figs. 4 and 5 are views similar to Figs. 1 and 2 illustrating a rear wheel with a brake band applied thereto;

Fig. 6 is an inside face elevation of one of the wheel segments;

Fig. 7 is a transverse section of the brake band.

Referring to the embodiments of the invention illustrated, the wheel is composed of segments each comprising a plate 1 of tapered width, with converging side flanges 2 and concentric flanges 3 and 4 on its inner and outer edges, these flanges being bent up integrally from the sheet. Also the edge of the outer flange 3 is preferably bent back to form a flange 5 for limiting the position of the detachable rim 6. The segments, and consequently the wheel, may be also stiffened by forming each segment with concentric shoulders 7 and 8 adjacent to the outer and inner edges resectively. Outside of the shoulder 7 there is a space of sufficient width for the clamps 9 and nuts 10 which with the bolts 11 serve to hold the detachable rim in place. Similarly the margin beyond the shoulder 8 is of sufficient width to form a bearing for the ring 12 by which the segments are held on the hub.

The hub 13 has on the inside a flange 14. Each of the segments has its side flanges 2 bent inward to form recesses 15 and 16, Fig. 6. When the segments are brought together as in Fig. 1 these recesses constitute openings between the segments by which they are fastened, near the outer edge by means of the bolts 11, and near the inner edge by means of the bolts 17.

The parts being assembled in this way, the side flanges 2 form spokes or stiffeners, preferably in the radial directions shown.

The flanges 2, 3 and 4 are all on one side of the plate, which is made the inner side of the wheel, so that on the outside the wheel has the smooth appearance of a disk marked with radial lines.

The flanges 2 form a convenient means for firmly attaching a brake band as shown in Figs. 4, 5 and 7. The annular band 18 is formed with axial notches 19, Fig. 7, adapted to fit over the flanges 2 so as to interlock the band with such flanges. On the inside of the band are ears 20 extending down over the flanges 2 and having apertures in their lower ends through which pass the bolts 17 by which the segments are fastened to the hub. Thus the brake band is bolted on and is at the same time interlocked with the flanges of the wheel. This interlocking engagement saves strain on the bolts and permits of a very light fastening. The band may be attached in place in various other ways, as for example, by welding, the interlocking arrangement being retained and taking practically all the strain.

The principle of construction of the wheel may be applied not only to the single disk in Fig. 2, but also to a double-disk construction such as is illustrated for example in Fig. 3. Here the body of the wheel is made of two disks 21 and 22 made up of segments similar to that of Fig. 6 with radial flanges forming spokes or stiffening ribs, and with concentric flanges on the inner and outer edges; and the flanges projecting from one of the disks are pressed edge to edge against those projecting from the other disk and welded together, as for example along the dotted line 23. Each pair of individual segments may be welded together edge to edge to make a number of hollow, approximately triangular units which may be assembled in the same way as for Fig. 1. Or the segments of each side may be welded or otherwise united to form the complete disk, and the two disks thus formed may be assembled to make the complete wheel and welded or otherwise fastened together. Similarly the sections of the wheel of Fig. 1 may be assembled and united by means only of the bolts shown or they may also be welded or otherwise fastened together in proper relation.

The sheet metal segments may be used alone to make up a wheel as illustrated, or they may be used in combination with various additional elements.

Though I have described with great particularity certain specific embodiments of my invention, yet it is not to be understood therefrom that the invention is restricted to the particular embodiments illustrated. Various modifications thereof in detail and in the arrangement of the parts may be made by those skilled in the art without departure from the invention as defined in the following claims.

What I claim is:

1. A wheel comprising segments of sheet metal forming a disk and having flanges forming stiffeners for the disk and also integral flanges forming a limiting stop for a detachable rim.

2. A wheel comprising segments of sheet metal forming a disk and having integral flanges forming a bearing, and adapted to extend along one side of and to form a limiting stop for a detachable rim so as to limit its movement in one direction but not in the other.

3. A wheel comprising segments of sheet metal each segment consisting of a plate of tapered width with concentric flanges on its inner and outer edges and with concentric shoulders adjacent to said inner and outer edges.

4. A wheel comprising segments of sheet metal each segment consisting of a plate of tapered width with concentric shoulders formed by bends in the plate adjacent to its inner and outer edges.

5. A wheel comprising segments of sheet metal forming a disk and having flanges forming stiffeners for the disk in combination with a brake band having an interlocking engagement with said flanges.

6. A wheel comprising segments of sheet metal forming a disk and having flanges forming stiffeners for the disk in combination with a brake band bolted to said segments and having an interlocking engagement with said flanges.

In witness whereof, I have hereunto signed my name.

THOMAS E. MURRAY.